E. VICK.
COMBINED CLUTCH OPERATING GEAR AND BRAKE MECHANISM FOR REVOLUTION STAMPING PRESSES.
APPLICATION FILED APR. 5, 1921.
1,391,923.
Patented Sept. 27, 1921.
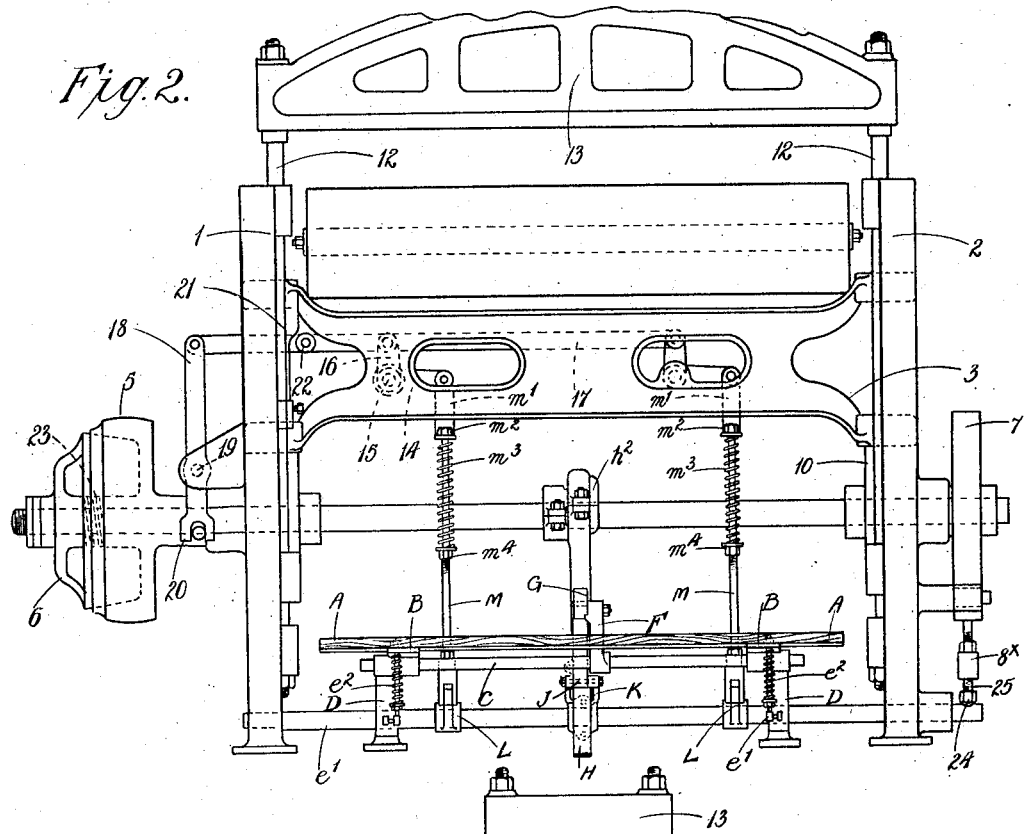
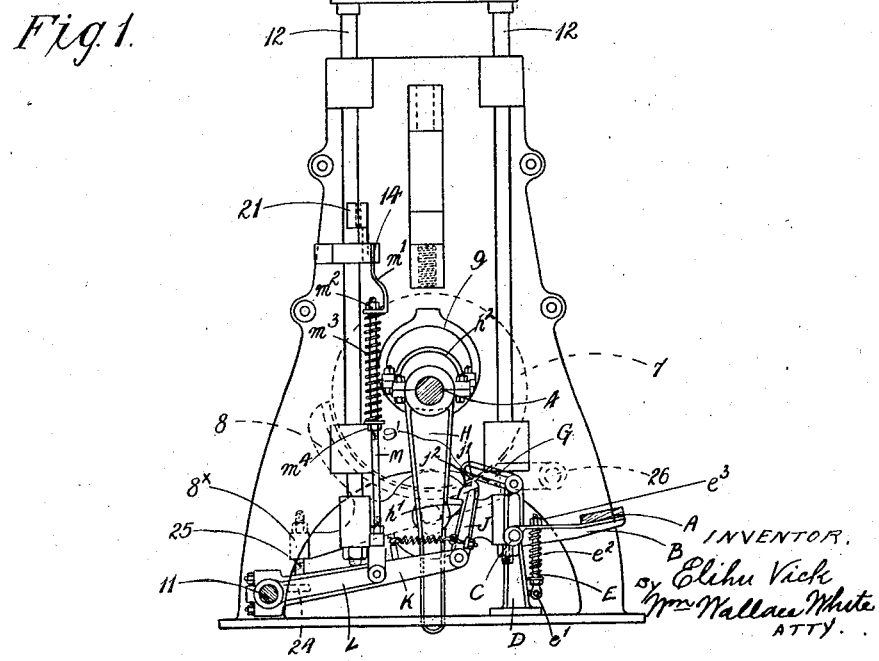

UNITED STATES PATENT OFFICE.

ELIHU VICK, OF NAILSWORTH, ENGLAND.

COMBINED CLUTCH-OPERATING GEAR AND BRAKE MECHANISM FOR REVOLUTION STAMPING-PRESSES.

1,391,923. Specification of Letters Patent. Patented Sept. 27, 1921.

Application filed April 5, 1921. Serial No. 458,692.

*To all whom it may concern:*

Be it known that I, ELIHU VICK, a subject of His Majesty the King of Great Britain and Ireland, residing at Tanner's Piece, Nailsworth, in the county of Gloucester, England, have invented new and useful Improvements in Combined Clutch-Operating Gear and Brake Mechanism for Revolution Stamping-Presses, (for which I have filed an application in England, Dec. 3, 1919,) of which the following is a specification.

This invention has reference to combined clutch operating gear and brake mechanism for the well known revolution type of stamping presses, the objects of my invention being to provide simple and efficient means whereby on the depression of the pedal by the operator's foot, the driving clutch will be brought into action to start the machine and bring down the stamping top, which, on rising again to its top position will be there retained by the ordinary brake, the brake shoe of which is automatically applied at the proper time by a part of my invention. My said invention is so designed as to prevent accidents which have hitherto been caused by a repeated revolutions of the press with one pressure of the operator's foot on the treadle and also to obtain increased efficiency of the press owing to quicker contact and release of the driving clutch and the positive stop of the press with the stamping top part in its highest position, and moreover when my invention is applied, less effort is required by the operator and thus enabling a weaker man to work the press.

Referring to the drawings:—

Figure 1 is an end elevation, and

Fig. 2 is a front elevation.

The said well known revolution type of stamping press has two frames 1, 2, suitably held together as by transverse cast iron members 3, these frames carrying the main driving shaft 4 upon which is mounted the driving clutch usually leather to metal cone type of clutch of which the part 5 is adapted to revolve freely and to slide on the shaft 4 and is running continuously being driven by a band, and the part 6 is fixed to said shaft, and on this driving shaft there is a brake wheel 7 combined with a leather lined or other brake shoe 8 and fixed on said shaft there are two eccentrics 9, 10 which directly operate four vertically movable guide rods 12 which are firmly bolted to and support the massive cast iron stamping member 13 known as the stamping top. In this type of press the stamping top 13 descends only at the will of the operator which is effected by well known mechanism.

This known mechanism comprises a long wood foot pedal (to be depressed by the operator's foot) and this is carried by two foot levers (not shown on my drawing) mounted on the shaft 11 and connected by suitable connections to outstanding horizontal arms 14 of the two bell crank levers pivoted on fulcrum pins 15 carried by the transverse members 3, the upstanding arms 16 of these bell crank levers being connected to the clutch striking rod 17 adapted for horizontal movements and at one end connected to the upstanding end of the clutch lever 18 which is mounted on a fixed fulcrum pin 19 and at its lower forked end 20 engages with the sliding part 5 of the clutch so that by depressing the treadle, this sliding part of the clutch is caused to engage with the part 6 of the clutch and to turn the shaft 4 so that the eccentrics 9 bring down the stamping top 13. The moment the part 6 of the clutch is engaged and the other part 5 of the stamping top 13 has descended about three quarters of an inch, the projecting cam 21 which is fixed on one of the guide rods 12 engages with a roller 22 which is fixed on the clutch striking bar 17 and the part 5 of the clutch is thus locked against the part 6 until the press top 13 has returned again to within three quarters of an inch of the limit of its upward motion, and then the ascending cam 21 on the guide rod 12 is disengaged from the roller 22 of the clutch striking the rod 17 and allows the half clutch 5 to be drawn out of engagement with the half clutch 6 which is done by the internal coiled wire spring 23 which is provided between the two parts 5 and 6 of the clutch and then the brake shoe 8 is rapidly applied to the brake drum 7 by means of two powerful tension springs (not shown on my drawings) and which apply the brake shoe to the brake drum 7 so as to kill the momentum of the slowly ascending stamping top 13 which is thereby brought to rest. The said tension springs are connected to the said foot levers which are mounted on the shaft 11 on which latter there is a short outstanding arm 24 which acts against a screw 25 on the outer end of the bracket part $8^x$ of the brake shoe 8 which is mounted on a stationary fulcrum 26. The springs which raise the treadle and apply the brake having a pull of 150 to 200 lbs. so as to apply the brake shoe 8 quickly and with sufficient force on the brake drum 7. This pull of the springs has to be overcome by the pressure of the operator's foot every time the press is worked which is perhaps several hundred times every working hour and thus entails considerable fatigue which however is eliminated by my invention, as said tension springs are discarded.

According to my invention the combined clutch operating gear and brake mechanism for said revolution stamping press is arranged as follows:—

A is a transverse timber foot pedal which is fixed to two foot levers B which are keyed on the foot pedal shaft C which is carried in two foot pedal shaft bearing stands D fixed on the shop floor, and each of these shaft bearing stands D carries by the lug $e^1$ a stop rod $e^2$ and compression spring E, which latter acts under the foot lever B so as to lift the same against the nut $e^3$ on the rod $e^2$, which nut $e^3$ thus forms an adjustable stop to limit the upward turning movement of the pedal shaft C and parts fixed thereon. Fixed on the pedal shaft C there is an upwardly projecting rocking arm F which at its upper end carries the tripping catch lever G which has a downwardly projecting tooth $g^1$ on its lower side which is adapted to engage with the upwardly projecting tooth $j^1$ formed on the top of the main catch lever J which is made with a laterally projecting tooth $j^2$ which is adapted to engage with the tooth $h^1$ formed on the eccentric arm H, the eccentric straps of which are mounted on the eccentric $h^2$ which is fixed on the main driving shaft 4. The main catch lever J is jointed on the end of the auxiliary brake lever K which is fixed on the existing brake shaft 11, and fixed on this shaft 11 there are also the two brake levers L which replace the existing foot levers and tension springs. Jointed to the ends of these two brake levers L, there are two upstanding connecting rods M, the upper ends of which pass up through holes in two links $m^1$ which at their top ends are jointed to the existing clutch operating levers 14. Each connecting rod M has a nut $m^2$ on its top end to bear on the link $m^1$, and thus make the combined connecting rod and link rigid in tension but collapsible in compression by the connecting rod sliding up through the hole in the link $m^1$ against the pressure of a coiled wire spring $m^3$ which is mounted on the connecting rod M and acts between the underside of the link $m^1$ and the washer and nut $m^4$ on the connecting rod M.

The operation of my invention is as follows:—Assuming the parts are in the positions shown by my drawings with the stamping top 13 stationary and in its highest position and the main shaft 4 also stationary with the part 5 of the clutch revolving thereon and driven by a band, then when the operator depresses the pedal A, this causes the tripping pawl G to pull the catch pawl J clear of the lateral projection on the eccentric arm H so that the catch pawl J with the brake lever K and levers L and rods M now fall by gravity, thereby depressing the levers 14 and moving the clutch bar 17 toward the right hand in Fig. 1 and pressing the part 5 of the clutch against the part 6, so that the main shaft 4 with the eccentrics instantly commence to revolve and the stamping top 13 descends and at the same time the eccentric arm H descends and passes the pawl of the catch lever J, and on the upward stroke the lateral projection $h^1$ of the eccentric arm H engages the catch pawl J and raises the same with the brake lever K, turning the shaft 11 and causing the arm 24 to turn upwardly and to bear against the screw 25 and instantly apply the brake shoe 8 to the brake wheel 7, thereby bringing the stamping top to rest again in its highest position. The eccentric $h^2$ is made adjustable on the main shaft so that its angular position and that of the eccentric arm can be advanced to any required angle in respect of the two eccentrics 9, 10, of the press and thus the brake 8 can be applied at the desired moment which makes it practically impossible for the press to run on. The connections from the levers L to the levers 14 are purposely made rigid in tension and collapsible in compression so that the part of the clutch 5 is instantly put into gear with the part 6 immediately the catch lever J is released, but by the combined rods M and springs $m^3$ being collapsible in compression any undue strain on the roller 22 and the cam 21 is avoided which otherwise might take place owing to the fact that the rods M commence their upward movement before the cam 21 is due to disengage the roller 22; a further great advantage obtained by the compression springs $m^3$ is that they move the clutch striking fork 18 rapidly forward immediately the roller 22 has been released by the cam 21 so that the part 5 of the clutch is at the proper moment instantly moved out of gear with the part 6 of the clutch to bring the stamping top 13 to rest in its top position as aforesaid. A tension spring $j^3$ connects the catch lever J to the lever K so as to keep the catch end $j^2$ properly in engagement with the tooth $h^1$ of the eccentric rod H.

What I claim as my invention and desire to secure by Letters Patent is:—

1. In a stamping press the combination of a stamping top, a main driving shaft, means carried by said driving shaft to reciprocate said stamping top, a clutch upon said driving shaft, a pedal lever, a pair of interconnected levers associated with said pedal lever, means connecting said levers and said clutch, which means positively operate in one direction but allow relative movement in the other, whereby the clutch is operated to drive the shaft and to reciprocate the stamping top, means carried by said driving shaft to return said pedal and levers to its normal position and allow the clutch to disengage, a brake associated with the driving shaft and means associated with said levers to apply said brake when the levers are returned to their normal position.

2. In a stamping press the combination of, a stamping top, a main driving shaft, means carried by said driving shaft to reciprocate said stamping top, a clutch upon said driving shaft, a pedal lever, a pair of interconnected levers, means for supporting the said levers, means associated with said pedal to trip said supporting means, means connecting said levers and said clutch, which means positively operate in one direction but allow relative movement in the other, whereby the clutch is operated to drive the shaft and to reciprocate the stamping top, means carried by said driving shaft to return the said supporting means and pedal into its normal condition and allow the clutch to disengage, a brake associated with the driving shaft and means associated with said levers to apply said brake when the levers are returned to their normal position.

3. In a stamping press the combination of, a stamping top, a main driving shaft, means carried by said driving shaft to reciprocate said stamping top, a clutch upon said driving shaft, a pedal lever, a pair of interconnected levers, a catch lever adapted to support said levers, a trip lever carried by said pedal to trip said catch lever, means connecting said levers and said clutch, which means positively operate in one direction but allow relative movement in the other, whereby the clutch is operated to drive the shaft and to reciprocate the stamping top, means carried by said driving shaft to return said supporting means and pedal into its normal position and allow the clutch to disengage, a brake associated with the driving shaft and means associated with said levers to apply said brake when the levers are returned to their normal position.

4. In a stamping press the combination of, a stamping top, a main driving shaft, means carried by said driving shaft to reciprocate said stamping top, a clutch upon said driving shaft, a pedal lever, a pair of interconnected levers associated with said pedal lever, a rod mounted upon one of said levers, a plate member associated with said clutch and having a hole for the said rod, an abutment carried by said rod adjacent to one side of said plate and a spring carried by the rod an opposite face to cause the rod to act positively in one direction but allow relative movement in the other direction, whereby the clutch is operated to drive the shaft and reciprocate the stamping top, means carried by said driving shaft to return said pedal and lever to its normal position and allow the clutch to disengage, a brake associated with the driving shaft and means associated with said levers to apply said brake when the levers are returned to their normal position.

5. In a stamping press the combination of, a stamping top, a main driving shaft, means carried by said driving shaft to reciprocate said stamping top, a clutch upon said driving shaft, a pedal lever, a pair of interconnected levers, means for supporting the said levers, means associated with said pedal to trip said supporting means, a rod mounted upon one of said levers, a plate member associated with said clutch and having a hole for the said rod, an abutment carried by said rod adjacent to one side of said plate and a spring carried by the rod, an opposite face to cause the rod to act positively in one direction but allow relative movement in the other direction, whereby the clutch is operated to drive the shaft and reciprocate the stamping top, means carried by said driving shaft to return said pedal and lever to its normal position and allow the clutch to disengage, a brake associated with the driving shaft and means associated with said levers to apply said brake when the levers are returned to their normal position.

6. In a stamping press the combination of, a stamping top, a main driving shaft, means carried by said driving shaft to reciprocate said stamping top, a clutch upon said driving shaft, a pedal lever, a pair of interconnected levers, a catch lever adapted to support said levers, a trip lever carried by said pedal to trip said catch lever, a rod mounted upon one of said levers, a plate member associated with said clutch and having a hole for the said rod, an abutment carried by said rod adjacent to one side of said plate and a spring carried by the rod, an opposite face to cause the rod to act positively in one direction but allow relative movement in the other direction, whereby the clutch is operated to drive the shaft and reciprocate the stamping top, means carried by said driving shaft to return said pedal and lever to its normal position and allow the clutch to disengage, a brake associated with the driving shaft and means associated with said levers to apply said brake when the levers are returned to their normal position.

7. In a stamping press, the combination of, a stamping top, a main driving shaft, means carried by said driving shaft to reciprocate said stamping top, a clutch upon said driving shaft, a pedal lever, a pair of interconnected levers, a catch lever adapted to support said levers, a trip lever carried by said pedal to trip said catch lever, means connecting said levers and said clutch, which means positively operate in one direction but allow relative movement in the other, whereby the clutch is operated to drive the shaft and to reciprocate the stamping top, a projection carried by said driving shaft adapted to engage with and move the catch lever together with the pedal and interconnected levers into its normal position and allow the clutch to disengage, a break associated with the driving shaft and means associated with said levers to apply said brake when the levers are returned to their normal position.

8. In clutch and brake operating mechanism for stamping presses the combination of a pedal lever, a pair of interconnected levers associated with said pedal lever, means for connecting said levers with the driving clutch, which means positively operate in one direction but allow relative movement in the opposite direction, means operated by the driving shaft to return said pedal and levers to their normal position and allow the clutch to disengage, and means associated with said levers to apply the brake when the levers are returned to their normal position.

9. In clutch and brake operating mechanism for stamping presses the combination of, a pedal lever, a pair of interconnected levers, means for supporting the said levers, means associated with said pedal to trip said supporting means, means for connecting said levers with the driving clutch, which means positively operate in one direction but allow relative movement in the opposite direction, means operated by the driving shaft to return said pedal and levers to their normal position and allow the clutch to disengage, and means associated with said levers to apply the brake when the levers are returned to their normal position.

10. In clutch and brake operating mechanism for stamping presses the combination of a pedal lever, a pair of interconnected levers, a catch lever adapted to support said levers, a trip lever carried by said pedal to trip said catch lever, means for connecting said levers with the driving clutch, which means positively operate in one direction but allow relative movement in the opposite direction, means operated by the driving shaft to return said pedal and levers to their normal position and allow the clutch to disengage, and means associated with said levers to apply the brake when the levers are returned to their normal position.

11. In clutch and brake operating mechanism for stamping presses the combination of a pedal lever, a pair of interconnected levers, a rod mounted upon one of said levers, a plate member associated with said clutch and having a hole for the said rod, an abutment carried by said rod adjacent to one side of said plate and a spring carried by the rod, an opposite face to cause the rod to act positively in one direction but allow relative movement in the other direction, whereby the clutch is operated to drive the shaft and reciprocate the stamping top, means operated by the driving shaft to return said pedal and levers to their normal position and allow the clutch to disengage, and means associated with said levers to apply the brake when the levers are returned to their normal position.

12. In clutch and brake operating mechanism for stamping presses the combination of a pedal lever, a pair of interconnected levers, a rod mounted upon one of said levers, a plate member associated with said clutch and having a hole for the said rod, an abutment carried by said rod adjacent to one side of said plate and a spring carried by the rod an opposite face to cause the rod to act positively in one direction but allow relative movement in the other direction, whereby the clutch is operated to drive the shaft and reciprocate the stamping top, means for supporting the said levers, means associated with said pedal to trip said supporting means, means operated by the driving shaft to return said pedal and levers to their normal position and allow the clutch to disengage, and means associated with said levers to apply the brake when the levers are returned to their normal position.

13. In clutch and brake operating mechanism for stamping presses the combination of a pedal lever, a pair of interconnected levers, a rod mounted upon one of said levers, a plate member associated with said clutch and having a hole for the said rod, an abutment carried by said rod adjacent to one side of said plate and a spring carried by the rod, an opposite face to cause the rod to act positively in one direction but allow realtive movement in the other direction whereby the clutch is operated to drive the shaft and reciprocate the stamping top, a catch lever adapted to support said levers, a trip lever carried by said pedal to trip said catch lever, means operated by the driving shaft to return said pedal and levers to their normal position and allow the clutch to disengage, and means associated with said levers to apply the brake when the levers are returned to their normal position.

In testimony whereof I have signed my name to this specification.

ELIHU VICK.